Feb. 7, 1967  G. E. SMELCER  3,302,959
DRIVE WHEEL MOUNTING INCLUDING RELEASABLE
CLAMPING AXLE CONNECTION
Filed Nov. 23, 1964  2 Sheets-Sheet 1
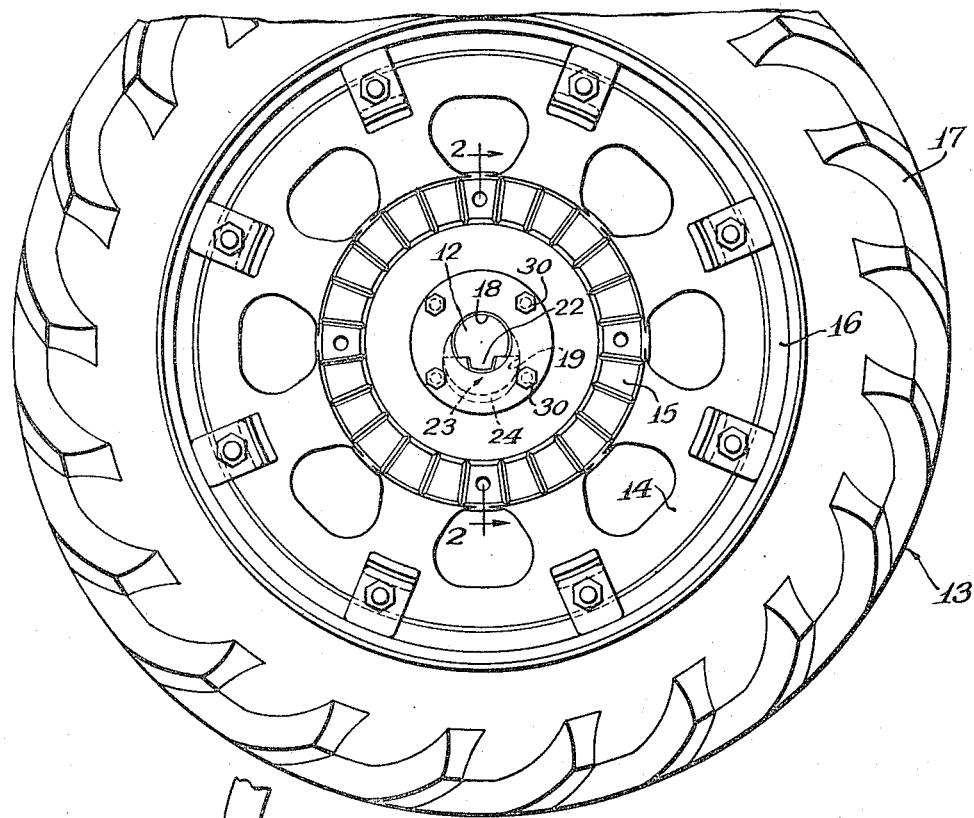
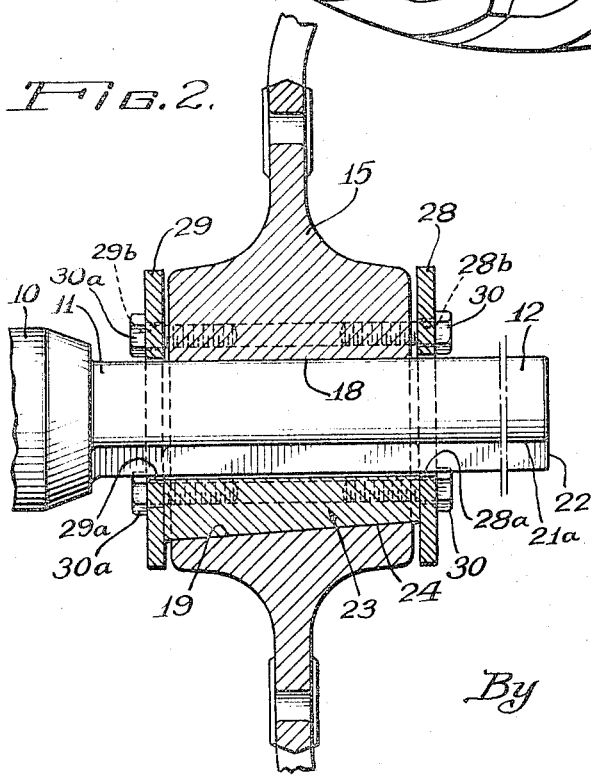
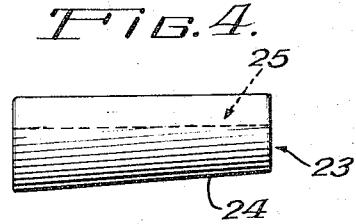
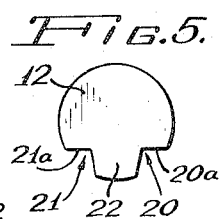
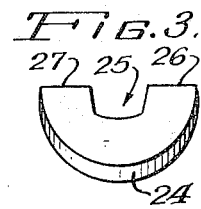
Inventor:
Glen E. Smelcer
By Walter G. Gregory
Atty.

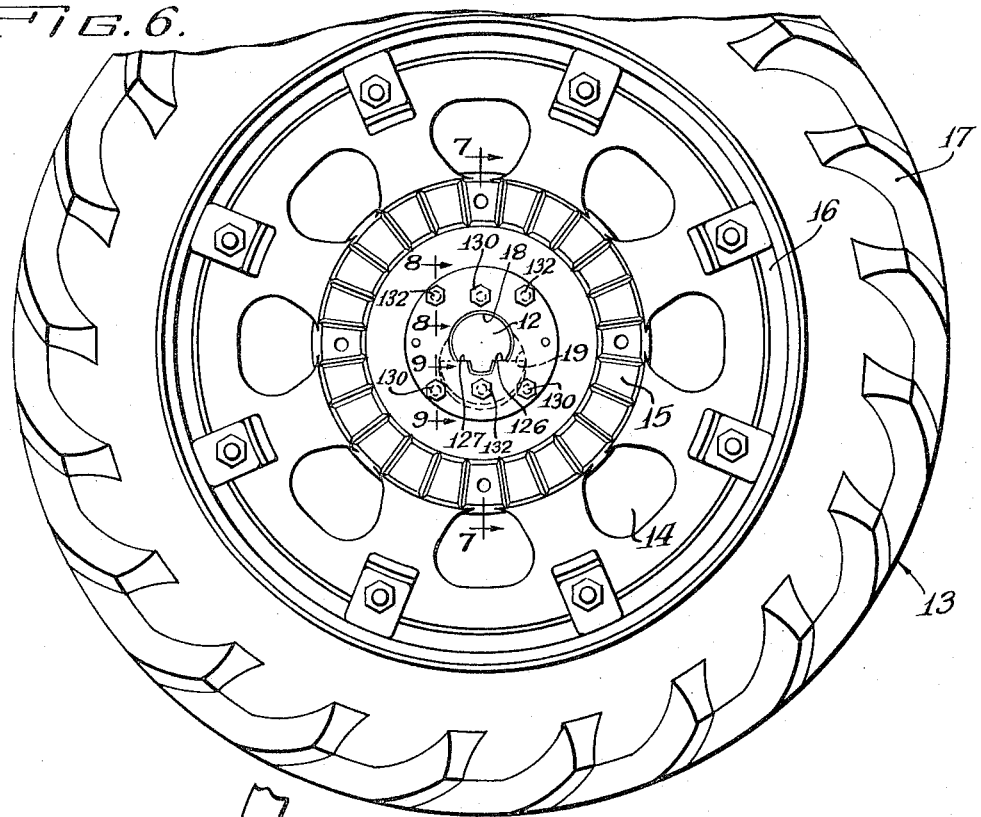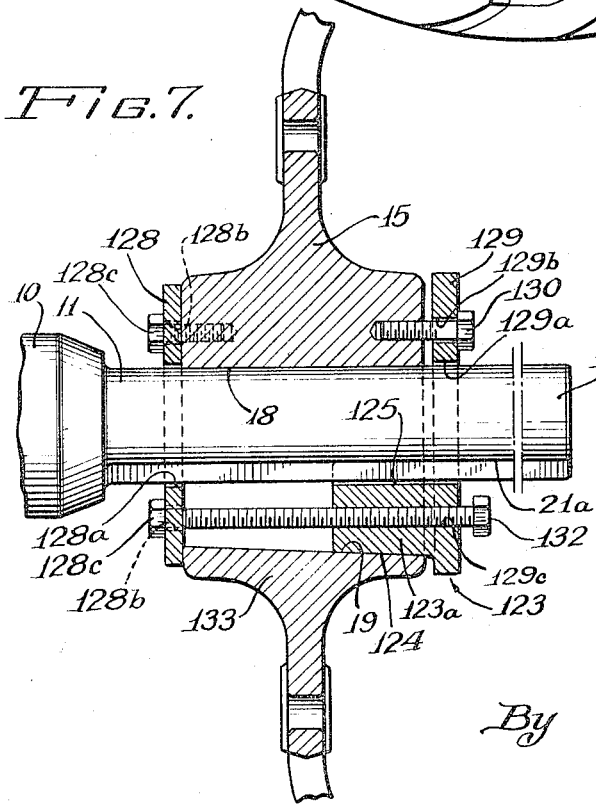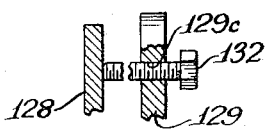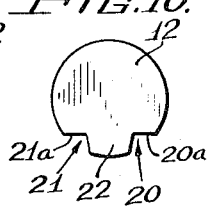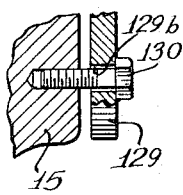

United States Patent Office 3,302,959
Patented Feb. 7, 1967

3,302,959
DRIVE WHEEL MOUNTING INCLUDING RELEASABLE CLAMPING AXLE CONNECTION
Glen E. Smelcer, Hinsdale, Ill., assignor to International Harvester Company, a corporation of Delaware
Filed Nov. 23, 1964, Ser. No. 412,923
7 Claims. (Cl. 287—52.06)

This invention relates to a torque transmitting and element securing mounting mechanism that transmits torque from an axle or shaft to a rotatably driven element while additionally providing a means for fixedly positioning the driven element at a preselected location longitudinally of the axle or shaft. More specifically, it is directed to a wheel mounting mechanism particularly applicable to agricultural tractors wherein the traction wheels are adjustable to provide tread variation.

Usually the ability to provide tread spacing or variation in agricultural tractors, particularly of the rear traction wheels, is a prerequisite to the flexible use of a tractor for all-around purposes on a farm. For example, in plowing, it is desirable that the wheels be adjustably spaced so as to have the line of pull of the plow pass through or near the center of the tractor, whereas in cultivating operations, the wheels should be spaced relatively widely apart so that the traction or drive wheels can straddle the crop in a pair of adjacent rows. Because of this factor most agricultural tractors presently provide for tread adjustability by one or another of a variety of means. For instance, agricultural tractors, particularly of the tricycle type, are frequently provided with a pair of relatively long oppositely extending rear axles on each of which a traction wheel is axially adjustable by means of a releasable clamping lug device through which torque is also transmitted from the axle to the respective wheel by way of a longitudinal keyway and key cooperative therebetween. This type of arrangement however, raises stress which, under the new increased horespowers and torques of modern tractors, frequently become excessive and as a result there is a tendency to crack and break the wheels unless the wheels are made exceptionally heavy to accommodate such a stress. To fashion such heavy wheels involves uneconomical construction and hence is not justified or desirable as a means for accommodating such stress and overcoming such deficiency.

It is a primary object of the present invention, therefore, to provide an improved tractor drive wheel adjustable mounting means that overcomes the aforementioned objectionable drawback of known prior art mechanisms and which, furthermore, is economical to fabricate and is readily adaptable for use with modern tractor wheel constructions.

Another object is to provide an adjustable tractor drive wheel mounting in the form of a drive mechanism that functions by wedging a tapered camming element between a flat surface on an axle and the surface of a nonconcentric and axially inclined cylindrical opening in a drive wheel mounted on the axle.

A further object is to provide a drive mechanism operative to transmit torque from an axle or shaft to a driven element mounted thereon by wedging a semi-cylindrical member of a diameter larger than the axle or shaft into an inclined and cylindrical opening in the driven element so as to wedgingly engage said member between a surface of said opening and a surface of said axle or shaft and thereby relieve said opening of excessive stress concentrations due to discontinuous contours in the surface of the opening when said drive mechanism is required to transmit large torque loads therethrough.

A still further object is to provide means for effecting driving contact between a drive axle and a wheel mounted thereon which includes means for imposing a large tangential force component on the hub of said wheel at a larger radius than said axle can provide.

A yet still further object is to provide adjustable means for securely positioning a drive wheel on an axle wherein said means also effects a driving contact between said axle and said wheel for transmitting driving torque therethrough.

Another important object is to provide adjustable means for axially maintaining a drive wheel in a selected position on an axle while simultaneously transmitting driving torque between said axle and wheel, and wherein said means is additionally operative to cause the torque drive load transmitted therethrough to be effective in helping to maintain said wheel in its selected position on the axle.

Another important object is to provide means for effecting driving contact between a drive axle and a drive wheel mounted thereon wherein said means includes a plurality of sets of drivingly engaging surfaces and wherein one such set of surfaces also functions to provide clamping means for securely positioning said wheel at a selected location on said axle.

Other objects and advantages will be understood and will become more apparent from the following description when read in conjunction with the accompanying drawings, wherein:

FIGURE 1 is an elevational view of a tractor drive wheel with a drive wheel mounting incorporating the invention therein;

FIGURE 2 is a vertical sectional fragmentary view taken generally along the line 2—2 of FIGURE 1 and shown on an enlarged scale;

FIGURE 3 is an end elevational view of the cam member employed with the mounting shown in the preceding views;

FIGURE 4 is a front elevational view of the cam member of FIGURE 3;

FIGURE 5 is an end elevational view of the drive axle employed herein;

FIGURE 6 is a fragmentary elevational view of a tractor drive wheel incorporating a modified form of the invention therein;

FIGURE 7 is a vertical sectional view taken generally along the line 7—7 of FIGURE 6;

FIGURE 8 is a fragmentary vertical sectional view taken along the line 8—8 of FIGURE 6;

FIGURE 9 is a fragmentary vertical sectional view taken generally along line 9—9 of FIGURE 6; and FIGURE 10 is an end elevational view of the drive axle employed herein.

Referring now to the drawings illustrating one preferred embodiment of the invention it will be see a rear axle housing of an agricultural tractor, indicated generally by the reference numeral 10, has a drive axle 11 extending therethrough with an end portion 12 projecting outwardly therefrom.

A tractor wheel, indicated in its entirety by the numeral 13, has a central flange or web structure 14 to which is suitably affixed a central hub member 15. A tire rim 16 mounted peripherally on said web structure accommodates a pneumatic tire 17 mounted thereon in conventional manner.

The hub 15 has a bore opening 18 extending axially therethrough dimensioned to snugly receive the axle end portion 12 and has fashioned therein an additional axial opening 19 which overlaps a portion of opening 18 and is inclined at an angle relative to the horizontal rotative axis of said hub. Opening 19 is somewhat larger in diameter than opening 18 and the mating edges of said openings meet in a plane offset from the diametral center line of said smaller opening whereby said smaller opening is somewhat less than semi-cylindrical in cross section for a purpose which will presently be better understood.

The axle end portion 12 is fashioned to provide a pair of longitudinally extending recesses or notches 20, 21 with a tongue or key-like portion 22 of the axle therebetween. The horizontal surfaces 20a and 21a of the respective notches may be finished to provide what is frequently termed a "flat."

A cam member, indicated generally by the reference numeral 23, is semi-cylindrical in cross section and has the circular or arcuate outer surface 24 thereof tapered or inclined in one dimension relative to the longitudinal axis thereof to provide a wedge-like member from end to end. As fashioned said cam member may be said to resemble a semi-cylindrical wedge having a constant width and a variable thickness from end to end. A longitudinally extending groove or keyway 25 fashioned in the flat longitudinally extending diametral outer surface portion of said cam member divides the latter surface into a pair of spaced apart flats or surfaces 26, 27 which, preferably, are finished and which are adapted to engage the flats 20a, 21a of the axle end portion 12 as the groove 25 is dimensioned to overlie and slidably accommodate the tongue or key-like portion 22 of said axle when mated therewith. Cam member 23 is dimensioned for positioning in the inclined or diagonal opening 19 in hub 15 while tongue 22 is received in groove 25 of said cam. The longitudinal length of cam 23 may be slightly greater than the longitudinal dimension of the diagonal opening 19 through hub 15 for purposes which will presently be apparent.

A pair of holding or retainer guide plates 28, 29 disposed proximate opposite ends of cam member 23 are each provided with a central opening 28a, 29a which is slightly larger in diameter than that of the axle end portion 12. Each such guide plate is provided with a plurality of openings such as 28b, 29b adapted to rotatably receive bolts such as 30, 30a which are suitably threaded into hub 15. It will be seen that by loosening the bolts 30 in retainer plate 28 and tightening bolts 30a in retainer plate 29 cam member 23 may be moved to the right, as viewed in FIGURE 2, thus tending to wedge said cam in tighter fitting contact relation between hub 15 and axle 12, while loosening bolts 30a in plate 29 and tightening bolts 30 in plate 28 will cause cam member 22 to move to the left and thus diminish the contacting engagement between axle 12 and hub 15 by way of said cam member. As arranged the plate 29 and its associated adjusting bolts may be termed pull-up means, while plate 28 and its adjusting bolts may be termed force-out means. In the loosened position the wheel may be manually vertically rocked transversely of the axle to effect a sliding of the wheel along the axle and by so doing change the tread or spacing between the drive wheels of the tractor. Axial openings 28a, 29a, respectively, are purposely made larger than the axle end portion 12 in order to permit this axial rocking adjustment of the wheels.

In utilizing the present invention after the wheel hub 15 is positioned on axle 12 cam member 23 is positioned between said axle and the surface of the inclined or diagonal opening 19 with the flats or surfaces 20a, 21a of axle 12 in engagement with the respective complemental flats or surfaces 26, 27 of said cam while tongue 22 of the axle is slightly spaced from its mating groove 25 in the cam member, whereupon said cam may be wedged into an initial securing relation by pulling up plate 29 by tightening the bolts 30a. In this manner the wheel hub is tightly secured and axially positioned by a preload clamping affixment to the axle for rotation therewith. Now when drive is applied to axle 12 the axle tends to rotate about its own axis while cam member 23 tends to rotate about an axis or center offset from that of said axle thereby tending to force the respective complemental flat surfaces of axle and cam into a tighter contacting relation, as a result of which as the driving torque increases the wedging action or force of the cam between said axle and wheel hub increases. This action provides a form of self-locking mechanism wherein the torque transmitting ability and axial clamping ability of this drive mechanism increases with increased driving torque from the axle. Furthermore, as the axle 12 and cam 23 rotate one of the side faces or surfaces of tongue 22 of axle 12 engages an adjacent surface of grooves 25 of cam 23 and thus provides an additional means for transmitting drive from the axle to the cam member 23. This being the case the proposed device has the ability to drive on two different surfaces simultaneously e.g. through the flats 20a, 21a and 26, 27 and through opposing surfaces of tongue 22 and groove 25.

In FIGURES 6–10 there is illustrated a modified embodiment of the proposed invention. In this embodiment the same reference numerals are used to represent comparable elements of the previous embodiment. As before, the rear axle housing 10 has a drive axle 11 extending therethrough with an end portion 12 projecting outwardly therefrom. A tractor wheel 13 includes a central flange or web structure 14 to which is suitably affixed a central hub 15, and a tire rim 16 mounted on said web structure accommodates a pneumatic tire 17 mounted in conventional manner thereon.

Hub 15 has an opening 18 extending axially therethrough and dimensioned to snugly receive axle end portion 12. Hub 15 has fashioned therein an additional axially extending opening 19 which overlaps a portion of opening 18 as in the previous embodiment and is inclined at an angle relative to the horizontal rotative axis of said hub. Opening 19 is somewhat larger in diameter than opening 18 as previously noted.

The axle end portion 12 is fashioned to provide a pair of longitudinally extending recesses or notches 20, 21 with a tongue or key-like portion 22 of the axle therebetween. The horizontal surfaces 20a, 21a of the respective notches may be finished to provide flats.

A cam member, indicated generally by the reference numeral 123, has a projection 123a which is semi-cylindrical in cross section and which has the circular or arcuately shaped outer surface 124 of said projection tapered or inclined relative to the longitudinal axis thereof to provide a wedge-like member. As fashioned said cam projection resembles a semi-cylindrical wedge with a constant width and a variable thickness from end to end. A longitudinally extending groove or keyway 125 fashioned in the flat longitudinally extending diametral outer surface portion of the cam divides said surface into a pair of spaced apart flats or surfaces 126, 127 which are finished and adapted to engage the flats 20a, 21a of axle end portion 12 as the groove 125 overlies and slidably accommodates tongue 22 of said axle when mated therewith. Cam projection member 123a is dimensioned for positioning in diagonal opening 19 in hub 15 while tongue 22 is received in groove 125 of said cam.

A cover or abutment plate 128 is provided with a central opening 128a dimensioned slightly larger than the diameter of axle end portion 12 and is positioned thereover and into abutting relation with one end face of hub 15. Plate 128 additionally is provided with a plurality of peripherally spaced transverse openings such as 128b. Openings 128b which are unthreaded are adapted to rotatively accommodate bolts 128c which are threadably received in hub 15 and thus function to maintain plate 128 in closely abutting relation with the end face of hub 15.

A holding or retainer plate 129 at one end of cam projection 123a, preferably, is fashioned integral therewith although it is conceivable it could be independently fashioned and suitably secured to the cam member without deviating from the teachings hereof. Plate 129 is provided with a central opening 129a dimensioned slightly larger than the diameter of axle end portion 12. Plate 129, additionally, is provided with a first plurality of transverse openings such as 129b and a second plurality of transverse openings such as 129c. Openings 129b are unthreaded and adapted to rotatively accommodate bolts 130 which are threadably received in hub 15 and may be termed tightening bolts, while openings 129c are suitably threaded to receive bolts 132 which extend into abutting relation with the cover or abutment plate 128. It will be seen that by tightening bolts 130 cam member 123 is moved to the left thus tending to wedge said cam in tighter fitting contact relation between hub 15 and axle 12, while bolts 132 when threaded inwardly will engage the plate 128 and thereby force cam 123 rightwardly out of good driving relation and into a loose fit relation between hub 15 and axle 12. When the cam is loosely positioned between the axle and wheel hub the wheel may be rocked as previously noted to effect a slidable adjustment thereof along the axle.

As in the case of the previous embodiment drive is effected through the complementary engaging flats or surfaces 20a, 21a and 126, 127 as well as between the engaging surfaces of tongue 22 and groove 125.

It will be seen from the foregoing that in the second embodiment illustrated all adjustments may be made from the outer side of the drive wheel thus providing a substantial advantage particularly when dual wheel drive assemblies are used on vehicles.

It is conceivable as being within the inventive concepts of the present invention to omit the tongue element of the axle and its cooperating groove of the cam member and accomplish drive and clamping action solely through engagement of the complemental surfaces of the axle and cam member.

It is likewise conceivable that the proposed invention is particularly adaptable for mounting a pulley on a shaft or other such applications where driving torque is to be transmitted from one rotatable member to another and hence should not be deemed as limited to the specific embodiments chosen for purposes of illustrating other preferred embodiments of the inventive concept hereof.

It will be appreciated, of course, that the symmetrical arrangement of the proposed invention makes it equally effective for reverse as well as for forward operation of the drive wheels. With this arrangement excess stress concentrations because of discontinuous contours in contactingly engaging elements are greatly minimized, hence the possibility of damage by way of cracking or breaking of the wheel is likewise minimized. It will also be seen that this drive mechanism provides the advantage that since only cylindrical openings are used these may readily be broached instead of being turned in the wheel hub. Furthermore, the cam member because of its relatively small size may economically be made of a better, higher strength material than the wheel hub. In addition, since the cam contacts the wheel hub at a large radius it requires less tangential force for the same torque and because of such large radius of contact on the hub it will do less damage to the wheel under heavy torque loads than if the axle or a conventional key contacted the wheel hub.

The embodiments of the invention selected for the purposes of illustration and description herein are those preferred as a result of selective tests based upon requirements for achieving the objects of the invention and developing the utility thereof in the most desirable and facile manner, due regard being had to existing factors of economy, simplicity of design and construction, and the improvements sought to be effected. It will be appreciated, therefore, that the particular structural and functional aspects emphasized here are not intended to exclude, but rather to suggest, such other adaptations and modifications of the invention as fall within the spirit and scope of the invention as defined in the appended claims.

What is claimed is:

1. In combination with a tractor drive axle having a hub receiving end portion and a tractor drive wheel having a wheel structure provided with a central hub, mounting means providing a driving connection between said axle and said wheel comprising, an elongated cam member tapered along one dimension of the longitiudinal axial length thereof, said hub having an axial bore extending therethrough receiving said axle therein and an axially extending opening inclined relative to the axis of said bore with the smallest diameter of said opening being larger than the largest diameter of said bore and intersecting said bore throughout the axial length of said opening and receviing said cam member therein, interlocking means formed in part on said axle and in part on said cam member and being co-operative for constraining the latter member for rotation with said axle, retainer means proximate one end of said cam member and displaceable for urging said cam into a tight drive transmitting relation between said axle and said hub, means adjustably attaching said retainer means to said hub.

2. A wheel and axle assembly comprising: an axle having an outwardly extending end portion; a wheel having a hub with a central bore larger than and adapted to encircle the axle; said hub having an axially extending cylindrical opening with the smallest diameter of said opening being at least equal to the largest diameter of said central bore and inclined relative to the axis of said bore and intersecting said bore throughout the axial length of said opening; drive transmitting means interposed between said axle and said hub including an elongated semi-cylindrical member tapered in one dimension only along the longitudinal axis thereof and disposed in said inclined opening, and interlocking means cooperative between said axle and said member for constraining rotation of said member with said axle; said interlocking means including a pair of longitudinally extending notches fashioned in said axle with a longitudinally extending tongue portion of the axle therebetween, and a longitudinally extending groove fashioned in said semi-cylindrical member and dimensioned to receive said tongue portion therein and retainer means adjustably cooperative between said member and said hub and displaceable for urging said member into a tight drive transmitting relation between said axle and said hub.

3. A wheel and axle assembly comprising: an axle having an outwardly extending end portion; a wheel having a hub with a central bore larger than and adapted to encircle the axle; said hub having an axially extending cylindrical opening inclined relative to the axis of said bore with the smallest diameter of said opening being larger than the largest diameter of said bore and intersecting said bore throughout the axial length of said opening; said outwardly extending end portion of said axle having at least one flat longitudinally extending surface fashioned thereon; drive transmitting means interposed between said axle and said hub including an elongated semi-cylindrical member of varying thickness from end to end and having at least one flat longitudinally extending surface thereon and disposed in said inclined opening with the respective flat surfaces of said axle and member in mating contact relation; and retainer means adjustably cooperative between said member and said hub and being axially displaceable for urging said member into a tight drive transmitting relation between said axle and said hub.

4. A wheel and axle assembly comprising: an axle having an outwardly extending end portion; a wheel having a hub with a central bore larger than and adapted to encircle the axle; said hub having an axially extending cylindrical opening inclined relative to the axis of said bore and intersecting said bore throughout the axial length of said opening; said axle being fashioned with a pair of longitudinally extending recesses providing a pair of spaced apart longitudinally extending flat surfaces with a longitudinally extending tongue portion therebetween; an elongated semi-cylindrical member having an outer arcuate surface and a diametral flat surface and tapered from end to end in one dimension only and having the flat surface thereof provided with a longitudinally extending groove; said member being disposed in said inclined opening with the arcuate surface thereof in contacting engagement with the surface of said latter opening with said groove receiving said tongue and with complemental portions of the flat surface of said member engaging said pair of flat surfaces of said axle; and retainer means adjustably cooperative between said member and said hub for axially displacing and for forcing said member into a tight drive transmitting and securing relation between said axle and said hub.

5. In combination with a tractor drive axle having a hub receiving end portion and a tractor drive wheel having a wheel structure provided with a central hub, mounting means providing a driving and securing connection between said axle and said wheel comprising, an elongated member of varying thickness throughout the length thereof, said hub having a central bore extending therethrough receiving said axle therein and an axially extending opening inclined relative to the axis of said bore with the smallest diameter of said opening being larger than the largest diameter of said bore and intersecting said bore throughout the axial length of said opening and receiving said member therein, interlocking means formed in part on said axle and in part on said member and cooperative for constraining the latter member for rotation with said axle, said member having a flange at one end thereof and a central bore in said flange receiving said axle, first adjustable means cooperative between the flange of said member and said hub operative for axially displacing and forcing said member in one direction into a tight drive transmitting and securing relation between said axle and said hub, and second adjustable means cooperative between said member and a portion of said hub remote from the portion of said hub with which said flange cooperates operative for axially displacing said member in an opposite direction into a loosely disposed relation between said axle and said hub.

6. In combination with a tractor drive axle having a hub receiving end portion and a tractor drive wheel having a wheel structure provided with a central hub, mounting means providing a driving and clamping connection between said axle and said wheel comprising, an elongated member tapered in one dimension only along the longitudinal axial length thereof, said hub having a central bore extending therethrough receiving said axle therein and an axially extending opening inclined relative to the axis of said bore with the smallest diameter of said opening being larger than the largest diameter of said bore and overlapping a portion of said bore throughout the axial length of said opening and receiving said member therein, drive means including complemental surfaces formed in part on said axle and in part on said member and cooperatively engageable for constraining the latter member for rotation with said axle, said elongated member having an integrally formed transversely extending portion at one end thereof and having a bore therein receiving said axle, first adjustable means cooperative between said extending portion and said hub for axially displacing and forcing said member in a direction such as to effect a tight drive transmitting and clamping relation between said axle and said hub, and a second adjustable means cooperative between said extending portion and a portion of said hub remote from the portion of said hub with which said transversely extending portion cooperates for axially displacing and forcing said member in a direction such as to effect a loose fit relation between said axle and said hub.

7. A torque-transmitting and element-securing mounting assembly comprising: a rotatable shaft; a rotatable element having a hub portion with a central bore larger than and adapted to encircle the shaft; said hub having an axially extending cylindrical opening inclined relative to the axis of said bore with the smallest diameter of said opening being at least equal to the largest diameter of said central bore and intersecting said bore throughout the axial length of said opening, and having the longitudinally extending mating edges of said bore and opening meeting in a plane offset from the axial center line of said bore with said bore being constructed so as to be somewhat less than semi-cylindrical in cross section; drive transmitting means interposed between said shaft and said bore including an elongated semi-cylindrical member tapered in one dimension only along the longitudinal axis thereof and disposed in said inclined opening, and interlocking means cooperative between said shaft and said member for constraining rotation of said member with said shaft; and retainer means adjustably cooperative between said member and said hub and displaceable for urging said member into a tight drive transmitting and clamping relation between said shaft and said hub.

References Cited by the Examiner

UNITED STATES PATENTS

| 198,481 | 12/1877 | Woodbury | 287—52.05 |
| 2,524,903 | 10/1950 | Firth | 287—52.06 |
| 2,676,063 | 4/1954 | Whitt | 301—1 |
| 2,676,849 | 4/1954 | Houck | 301—1 |

FOREIGN PATENTS

| 162,467 | 3/1949 | Austria. |
| 138,651 | 9/1950 | Austria. |
| 1,192,621 | 4/1959 | France. |
| 706,999 | 4/1954 | Great Britain. |

MILTON BUCHLER, *Primary Examiner.*

BENJAMIN HERSH, *Examiner.*

R. J. JOHNSON, *Assistant Examiner.*